United States Patent [19]

Habenicht et al.

[11] Patent Number: 5,454,190
[45] Date of Patent: Oct. 3, 1995

[54] CLEANSED GRASS SOD AND METHOD FOR ITS PRODUCTION

[75] Inventors: Darin P. Habenicht, Momence; Larry R. Link, Frankfort, both of Ill.

[73] Assignee: American Roller Bushing Corporation, Monee, Ill.

[21] Appl. No.: 175,786

[22] Filed: Dec. 30, 1993

[51] Int. Cl.$^6$ .............................. A01B 79/00; A01C 1/00
[52] U.S. Cl. .................................. 47/58; 47/1.01
[58] Field of Search .................. 47/56, 15, 1.01, 47/58.25

[56] References Cited

U.S. PATENT DOCUMENTS

| | | |
|---|---|---|
| 3,810,480 | 5/1974 | Smith et al. |
| 3,810,786 | 5/1974 | Lindgren. |
| 3,868,272 | 2/1975 | Tardoskegyi. |
| 4,063,384 | 12/1977 | Warren et al. ............ 47/58.25 |
| 4,063,385 | 12/1977 | Friedberg. |
| 5,293,714 | 3/1994 | Bouchard et al. ............ 47/56 |

Primary Examiner—Barmon S. Britts
Assistant Examiner—Joanne C. Downs
Attorney, Agent, or Firm—Fitch, Even, Tabin & Flannery

[57] ABSTRACT

A method and apparatus for removing substantially all of the soil from a section of grass sod by soaking the section of sod with water to loosen the soil and to remove an initial portion of the soil, then brushing the root and soil side of the grass sod to brush substantially all of the remaining soil off of the grass sod, and finally rinsing the sod to rinse off any remaining soil. The brush sweeping against the roots of the sod raises the root ends upwardly and scratches the roots, both of which stimulate the roots for improved growth into the recipient soil site.

14 Claims, 4 Drawing Sheets

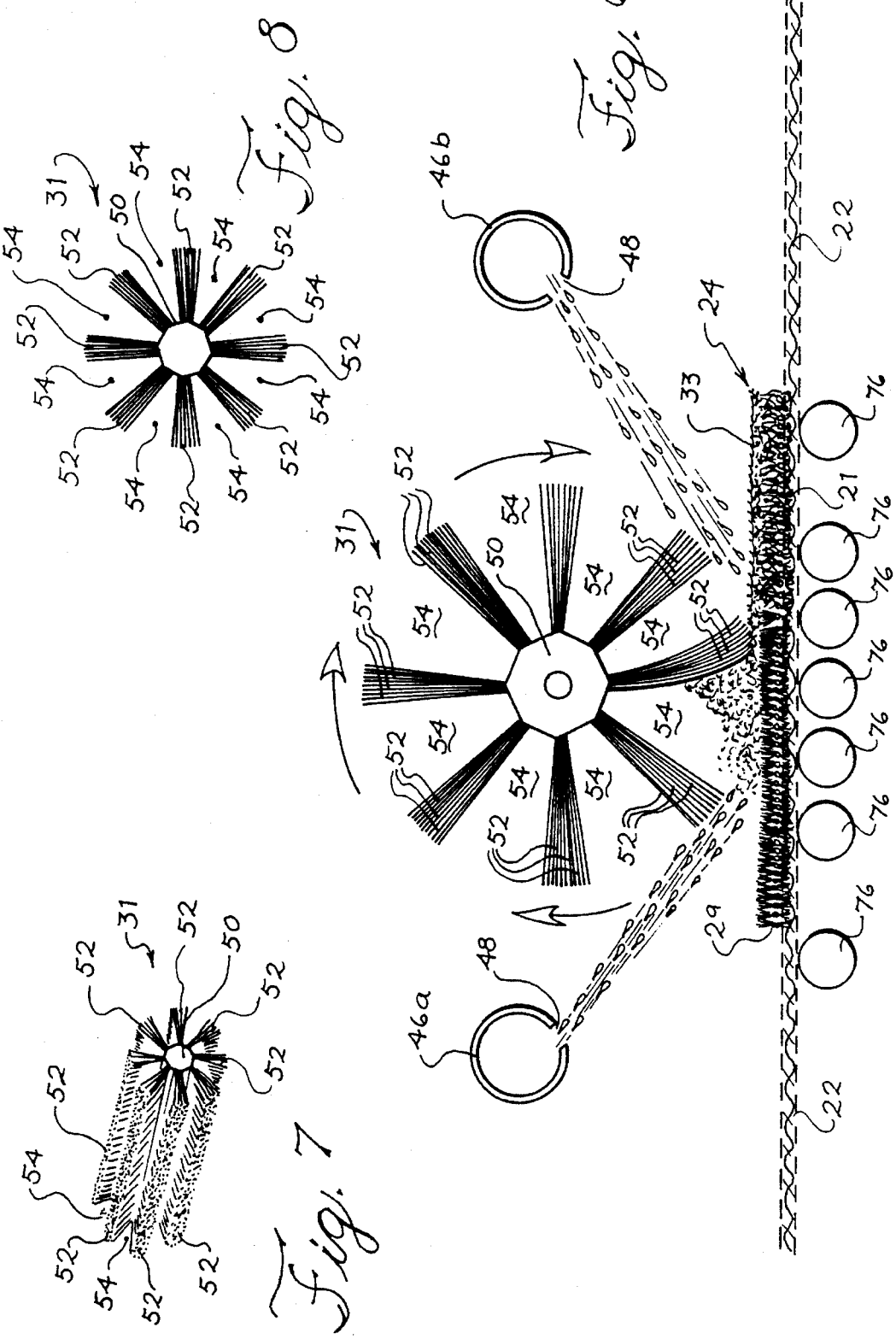

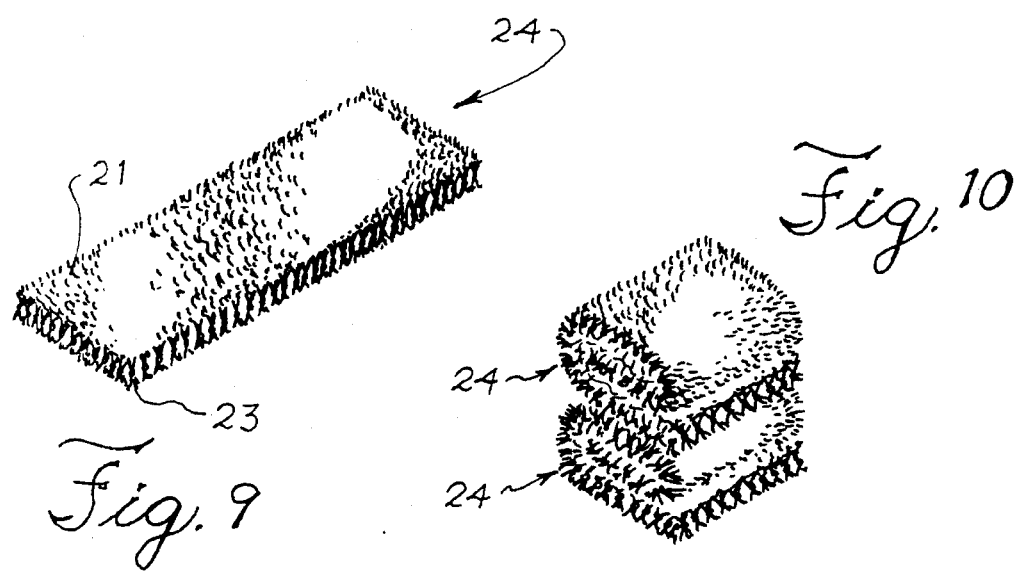
Fig. 9
Fig. 10
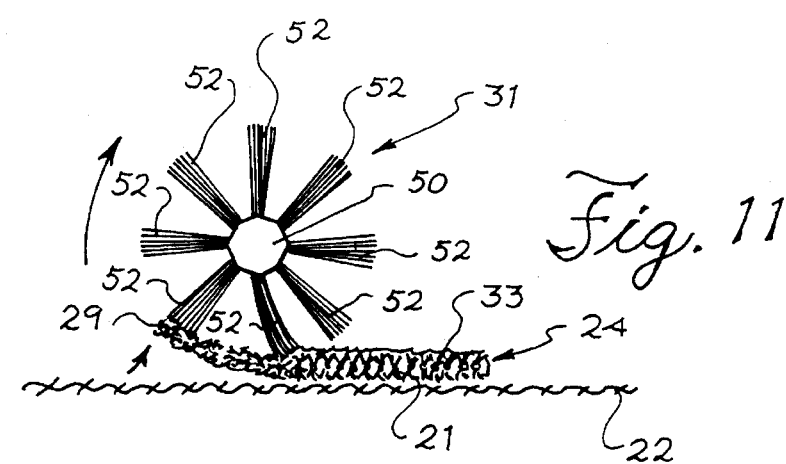
Fig. 11
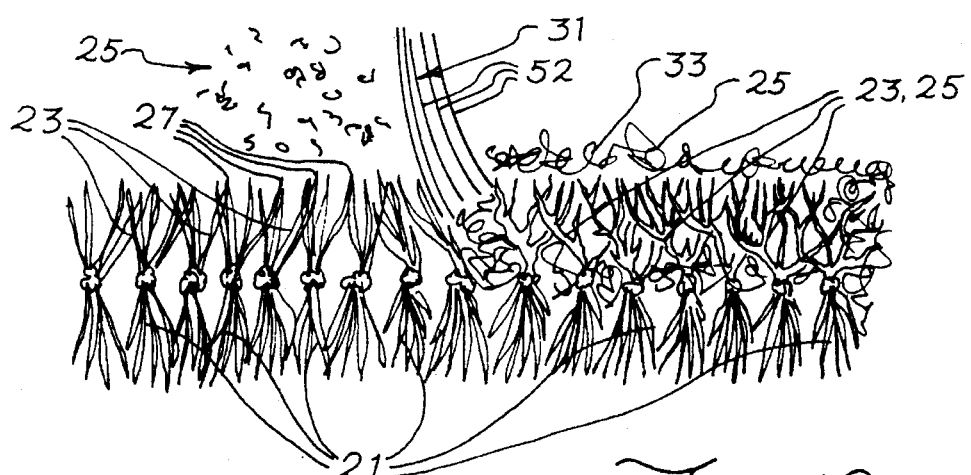
Fig. 12

CLEANSED GRASS SOD AND METHOD FOR ITS PRODUCTION

FIELD OF THE INVENTION

The present invention pertains to sod treatment, and more particularly, pertains to methods and apparatus for treating grass sod to remove soil therefrom and grass sod so produced.

BACKGROUND OF THE INVENTION

There is a demand for high quality grass sod having substantially all of its soil removed. For instance, the U.S.G.A. requires that their putting greens have a specific sand and peat soil mixture beneath the grass of their greens. Growers try to grow their grass in a soil having the specified sand and peat mix, but frequently the soil content is incorrect or other materials such as clay inadvertently get into the sand and peat mix. Thus, groundkeepers at golf courses are required to take a garden hose to the grass sod and wash the soil from the sod prior to applying the grass sod to the putting green, in order to assure that the soil beneath the grass met the exacting specifications of the U.S.G.A. Since manually washing each length of grass sod prior to applying it to a putting green is time consuming and the golf course is not particularly well suited for carrying out such sod washing, there is a demand for grass sod which has already had substantially all of its soil removed prior to shipment, so that further washing at the golf course, or other recipient site, is not necessary.

Sod grass having the soil still remaining thereon does not bond to the soil to which it is applied as well as sod grass which already has substantially all of its soil removed prior to being laid. The reason for this is that the roots stay in the thin nutrient-rich layer of soil of the sod, and do not penetrate down into the subsoil onto which the sod is laid. In dry weather, the thin layer of soil dries out and the lack of roots extending down into the subsoil results in burning of the grass blades of the laid sod. To prevent burning, the laid sod must have a great deal of extra water supplied thereto. While the presence of extra water keeps the thin layer of soil of the sod moist, it causes the growth of detrimental fungus in the layer of intermeshed soil and roots. Since the roots of grass sod which has had its soil removed therefrom prior to being laid grow down into the subsoil, rather than remaining substantially within the thin layer of soil of the sod as experienced with sod which has not been cleaned prior to being laid, the cleaned grass sod can utilize moisture of the subsoil, and is not dependent on the moisture of the thin layer of soil. Thus, less watering is required and there is less likelihood of growth of fungus.

One method and apparatus for washing sod is disclosed in U.S. Pat. No. 4,063,384. However, the method and apparatus disclosed therein suffer numerous shortcomings. The patented method and apparatus imparts high pressure water jets onto the grass sod to use water at high pressure to wash the soil from the grass sod. One major shortcoming of this method is that the high pressure of the water blows holes through the sod in areas where the sod is not sufficiently thick, such as where a weed had been pulled or some other flaw.

Another shortcoming of the patented apparatus and method is that the high pressure water jets utilized therein stretch out the grass sod and shred or tear the edges of the sod sections. Such shredded or torn edges have been found to experience burnout significantly more frequently than sod sections in which the integrity of the edges is maintained. Also, the roughened edges make it difficult to accurately position the sod sections closely adjacent one another as desired. Holes or rough edges between pieces of sod are on undesirable golf course greens.

A golf green will typically use 1,600 rolls of sod that are 18 inches in width and six feet in length. In the Summer, it is best to be able to cut the sod, wash the sod, transport the sod, and lay it in the same day to prevent the roots from drying out. With the apparatus of U. S. Pat. No. 4,063,384, the production rate is about 300 to 325 rolls per hour which requires about four or five hours for washing alone, thereby making it more difficult to cut, wash, transport and lay the sod for a green in the same day.

Another shortcoming in the use of the apparatus of U.S. Pat. No. 4,063,384 is that of handling the water after washing the sod and the disposal of the soil removed from sod. Typically, the water is collected at the apparatus and piped back to a cooling pond and a water reclamation device may be used. After several hours of use of the apparatus, the water, which is pumped from the pond and piped for washing, may be somewhat dirty thereby leaving the grass more dirty than is than desirable. A typical roll of sod may weigh 22 pounds with about ten pounds of grass and grass roots left after washing, and with about 12 pounds of soil, thatch, etc. washed from the roll of sod. Sixteen hundred (1,600) washed rolls of sod need for one golf green results in a large amount of soil that must be transported away from the apparatus disclosed in U.S. Pat. No. 4,063,384. Also, when using reclaimed water in the aforesaid apparatus, the water temperature may drop to an extent on hot days such that the grass is not as cool as desired after washing.

SUMMARY OF THE INVENTION

In accordance with the present invention, a method and apparatus for removing substantially all of the soil from sections of grass sod is disclosed which cleans the sod more rapidly and produces cleaned sod sections having better quality than those cleaned by the aforementioned patented apparatus and method.

Instead of blowing the soil from the sod sections with high pressure water jets, as done in the prior art, the method and apparatus of the present invention soak the sod sections with low pressure water to loosen the soil, and then apply a brush to the loosened soil side of the grass sod to brush away the soil. Water is preferably applied to the leading side of the brush at low pressure, e.g., the usual water line pressure of 45 psi, where the sod enters beneath the brush, to form a slurry of soil and water which is swept away by the brush, with the water also acting to cool the rotating brush. Water is also preferably applied to the trailing side of the brush, where the sod emerges from beneath the brush, to rinse soil from the brush and to rinse off substantially all soil remaining on the sod following brushing. In addition to brushing away the loosened dirt, the brush also brushes the roots of the grass. Proper brushing of the roots of the sections of grass sod with the brush has, unexpectedly, been found to positively stimulate growth of the roots, making the sod cleaned by the apparatus and method of the present invention superior to that cleaned by high pressure water jets without brushing. Specifically, the brush sweeping against the soil side of the sod sweeps against the intermeshed roots to raise the ends of the intermeshed roots upwardly, and the sweeping scratches the roots which stimulates the growth of new shoots. Both of these facilitate improved growth of the roots into the recipient soil.

The method and apparatus of the present invention is capable of cleaning 1,600 square yards of sod per hour, which rate is limited by manual loading and unloading operations so that production is generally limited to 800 to 900 square yards of sod per hour. The aforementioned prior art sod cleaning apparatus and method was usually capable of cleaning approximately 300 to 325 square yards of sod per hour.

In accordance with one aspect of the invention, the entire apparatus is portable, and the apparatus is hydraulically operable off the water from a standard irrigation line. Thus, the entire apparatus may be wheeled out into a field and operated in the field via hook up to an irrigation line, with the soil and water falling onto the ground in the field, with the apparatus then wheeled back into storage.

BRIEF DESCRIPTION OF THE DRAWINGS

In the drawings, wherein like elements are referenced alike:

FIG. 6 is an enlarged side view of the brushing portion of the apparatus of FIG. 1;

FIG. 7 is a perspective view of the preferred embodiment of the brush, suitable for use with the apparatus of FIG. 1; and FIG. 8 is an end view of the brush of FIG. 7.

FIG. 9 is a diagrammatic view of grass sod;

FIG. 10 is a view of two rolls of superimposed grass sod;

FIG. 11 is a view showing a brush, sod and a conveyor belt; and

FIG. 12 is a view of the grass sod and its root structure.

DETAILED DESCRIPTION OF THE PREFERRED EMBODIMENTS

Figure 1:
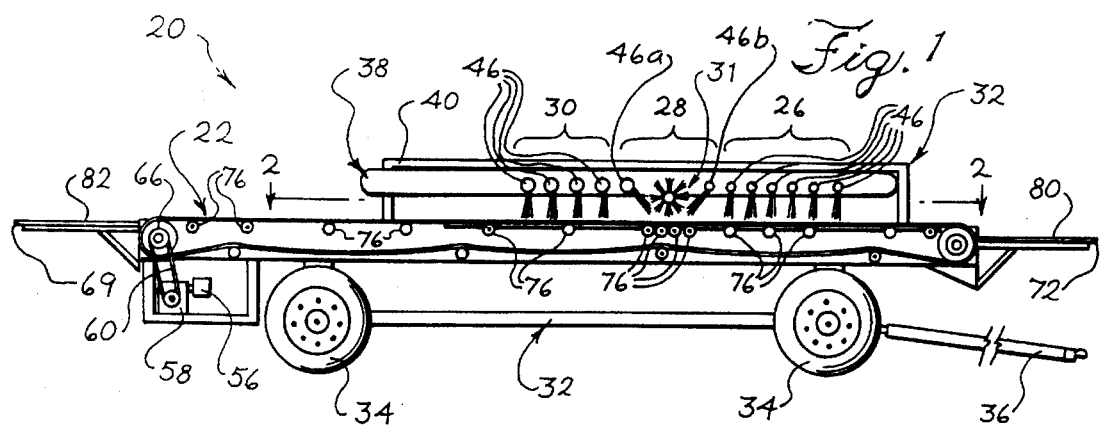
FIG. 1 is a side elevational view of a sod washing apparatus embodying various features of the present invention.

An apparatus embodying various features of the present invention is illustrated in FIG. 1 and referred to generally by reference numeral 20. The apparatus generally comprises a conveyor 22 for transporting a section of grass sod 24, with its grass blades 21 facing downwardly and its roots 23 and soil 25 facing upwardly (see FIG. 12), through a soaking station 26, brushing station 28 and, optionally, a rinsing station 30. In the soaking station 26, a high volume of water is imparted to the section of grass sod 24 under lower pressure to soak and loosen the soil. Thereafter, the section of grass sod 24 is advanced to the brushing station 28, at which the loosened soil is brushed from the sod section 24, preferably by a rotating brush 31 sweeping the soil and root side of the section of sod. Subsequently, the sod section 24 is preferably advanced to an optional rinsing station 30, at which a high volume of water is imparted to the section of grass sod 24 under low pressure to rinse off substantially all of the soil which may remain on the sod sections 24 subsequent to brushing, leaving a mat of grass blades held together by its root structure (see left side of FIG. 12).

When turned upright, the mat of grass sod so produced has an upper portion of grass blades 21, an intermediate portion of intertwined roots 23 of the grass blades which hold the sod section together, and a lower portion having the lower ends of the roots 23. As discussed below, the brushing of the sod 24 advantageously raises the root ends 27 and scratches the roots 23 sufficiently so that the roots are stimulated for improved growth into a recipient soil site. Brushing the sod 24 to sweep away the soil 25, rather than imparting high pressure water jets to the sod to blow away the soil, as done in the prior art, has been found to produce cleaned sections of sod having better aesthetics and growth characteristics than those produced by prior art methods and apparatus.

With reference to FIG. 1, the apparatus 20 comprises a frame referred to generally by reference numeral 32 which is preferably mounted on rubber tires 34 and has a draw bar 36 which can be pulled by a tractor or the like for easy rolling transportation of the apparatus 20 from a storage location such as a shed out into the field from which the grass sod is taken. Thus, the apparatus 20 may be wheeled into position over a ditch in the field so that the water, which has been used in the sod cleaning, falls into the ditch and is channelled across the field to water the crops, and the dirt falls into the field where it is beneficial to the growth of crops and does not need to be carted off. After the completion of sod cleaning operations, the apparatus 20 may then be wheeled back to the storage location for future use. The ability to drop the soil back into the field and to use the fields normal drainage eliminates the need for reclaiming water as has been proposed when using the apparatus of U.S. Pat. No. 4,063,384.

To provide uniform water distribution of water onto the sod sections, a water distribution arrangement 38 for dispensing water onto the sod at the soaking station 26 and rinsing station 30 is provided. The water distribution arrangement 38 is supported on an upper frame portion 40 with the conveyor 22 passing therebeneath. Accordingly, sections of grass sod 24 supported on the conveyor 22 pass beneath the water dispensed from the water distribution arrangement 38.

Figure 3:
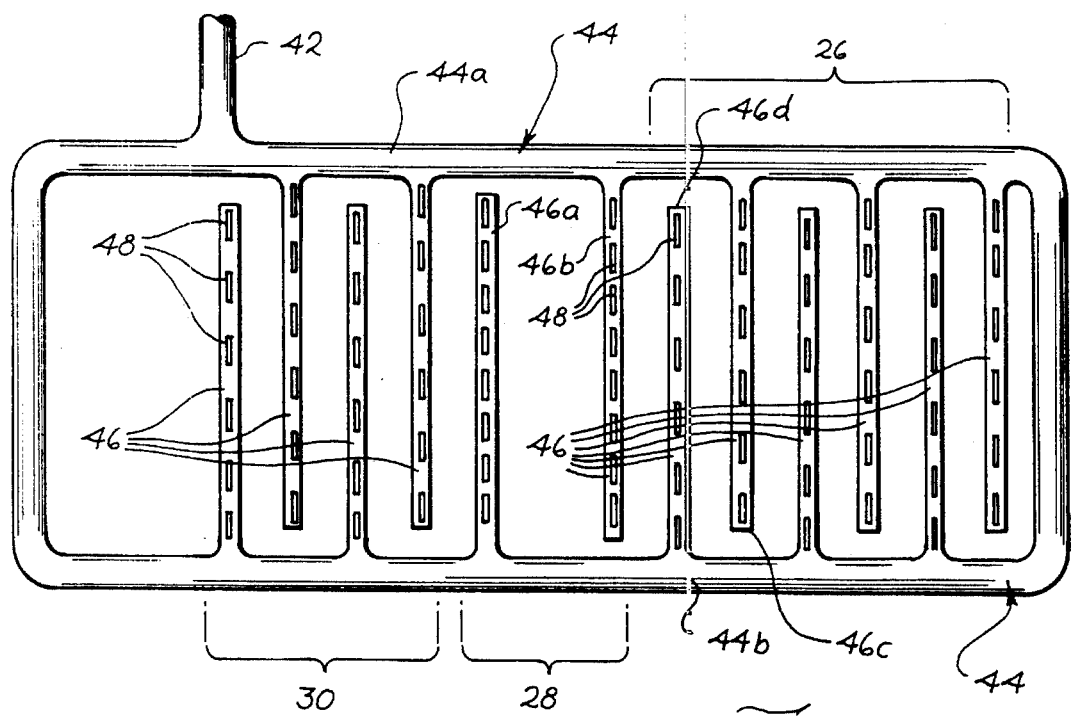
FIG. 3 is a schematic view of the lower side of the water distribution portion of the apparatus of FIG. 1.
Figure 4:
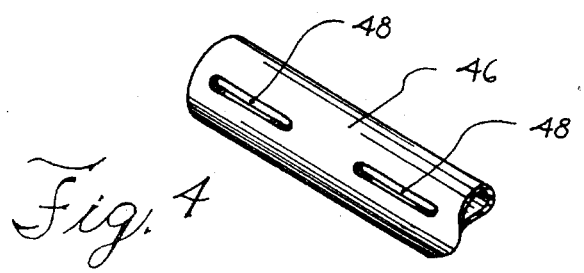
FIG. 4 is an enlarged view of the water distribution piping used in the water distribution portion of FIG. 3.
Figure 5:
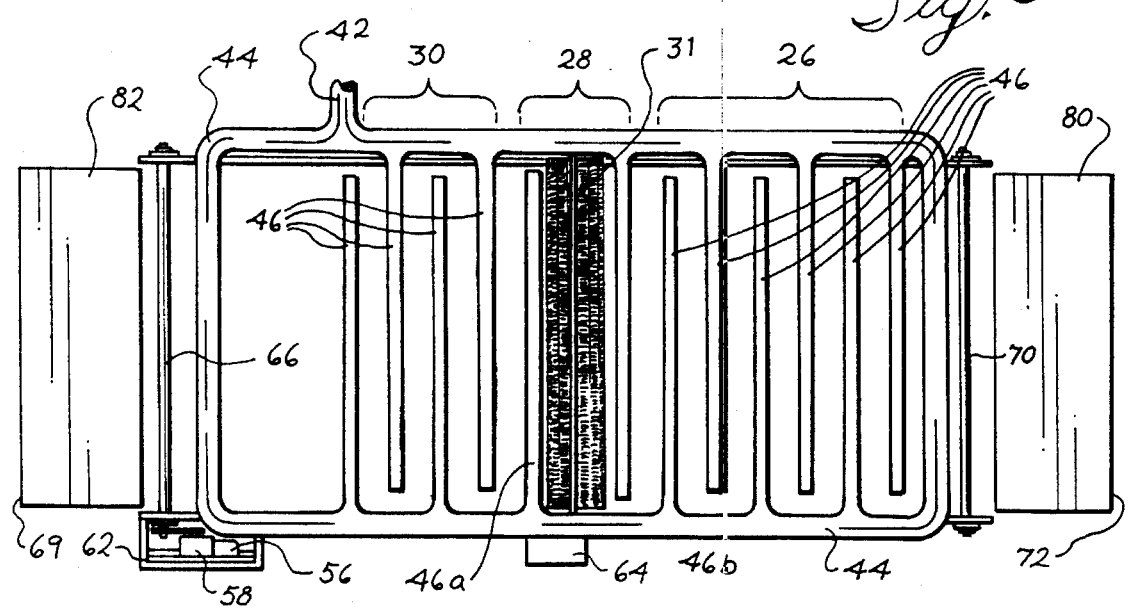
FIG. 5 is a plan view of the upper side of the water distribution portion of the apparatus of FIG. 3.

The water distribution arrangement 38 is best seen in the bottom view of FIG. 3 and the top view of FIG. 5 and comprises an inlet pipe 42 which leads into a rectangular header 44 having a plurality of inwardly extending water dispensing pipes referred to generally by reference numeral 46. Water flows in the inlet pipe 42, around the rectangular header, into the distribution pipes 46, and out the distribution pipes 46 through slits 48 formed in the undersides of the distribution pipes 46. A typical section of distribution pipe 46 is illustrated in FIG. 4, showing slits 48 formed therein. As seen in FIGS. 3 and 5, adjacent water dispensing pipes 46 extend inwardly from opposite sides of the header 44 to further assure that a generally uniform volume of water is distributed from each of the dispensing pipes 46 down onto the section of sod 24. By having header lines extending longitudinally along each side of the conveyor, water volume and pressure are applied substantially equally header pipe 44a closest to the inlet pipe 42 and header pipe 44b farther from the inlet pipe. Thus, the ends 46d of the water dispensing pipes adjacent header pipe 44a and end 46c of the water dispensing pipes 46 adjacent the header pipe 44b will have substantially equal flow and pressure of water for application to the opposite edges of the strip of sod. The water distribution arrangement 38 is preferably formed of PVC piping due to its low cost, light weight and durability.

The slits 48 are preferably formed in the lower end of the dispensing pipes 46 at a position to direct the water straight down from the pipes 46 onto the sod 24. As best illustrated in FIG. 6, the pipes 46a and 46b on either side of the brush 31 have their slits 48 formed so as to direct the water at an angle toward the brush 31, rather than straight down, for reasons which will be described below.

As mentioned previously, in the prior art water was sprayed onto the sod as high pressure jets of water, i.e. at around 70 psi., to wash the soil off of the sod. This is undesirable since the high pressure of the water has been found to frequently blow through thin grass areas of the sod, causing the formation of holes in the sod. The high pressure water jets used in the prior art also fray the edges of the sod stretch out the sections of sod, and tear the sod. The present invention overcomes these problem by using a brush to sweep the soil away rather than high pressure water jets to blow the soil away. A high volume of water is imparted to the sod under low pressure, i.e., at around 45 psi., through slits rather than through nozzles receiving water at high pressure as done in the prior art. Since the water is imparted to the sod under low pressure, the water itself does not wash away the soil from the grass sod, but only soaks or floods the soil at the soaking station while soaking to loosen it. Hence, the slits 48 in the water dispensing pipes 46 are made wide enough, and enough of them are provide, so that the water is not sprayed out under high pressure.

In the illustrated embodiment of the apparatus 20, there are six water dispensing pipes 46 in the soaking stage 26. Manifestly, the number of water dispensing pipes 46 may be varied. In particular, more pipes may be desired for applications in which the soil has heavier clays or other soil conditions wherein a greater supply of water is required to sufficiently loosen the soil prior to brushing. Sections of sod 24 are transported by the conveyor 22 beneath each of the six water dispensing pipes 46 of the soaking stage. Sufficient water is imparted to the sod to assure that the soil and grass are thoroughly soaked or flooded with water which causes the soil to be loosened and lifted after passing through the soaking station 26.

After being soaked with water in the soaking station 26 of the apparatus 20, the sod section 24 is transported by the conveyor 22 out of the soaking station 26 and into the brushing station 28. As best seen in FIG. 6, at the brushing station 28 of the apparatus 20 a plurality of fast moving brushes each rotate into position at a speed faster than the conveyor travel speed and push forwardly and lift the soil loosening the soil which is already wet. These fast moving brushes and the water being applied remove substantially all of the remaining soil from the section of grass sod, and a minor amount of grass clippings, which were not removed at the soaking stage. The brush 31 is mounted on the upper frame portion 40 for rotational movement and extends substantially horizontally across the width of the conveyor, spaced upwardly from the conveyor. As the section of grass sod 24 is moved beneath the rotating brush 31 by the conveyor 22, the bristles of the brush press downwardly onto the root and soil side of the sod section 24. The bristles 52 of the brush 31 are resilient so that they flex when pressed against the sod section 24, so that the bristles 52 of the brush 31 do not significantly tear the roots 23. The spacing of the brush 31 with respect to the conveyor 22 is variable, so that the apparatus 20 can accommodate variable sod thicknesses and/or soil conditions. Also, the bristles 52 of the brush 31 wear down and shorten over time, and adjustment of the height of the brush 31 is required to accommodate for this.

The preferred brushing stage arrangement is illustrated in FIGS. 6–8. The preferred brush 31 comprises a cylindrical tube 50 having a plurality of resilient bristles 52 extending radially outwardly therefrom. As best seen in FIGS. 7 and 8, the bristles 52 are preferably arranged into a plurality of separate groups, with the separate groups peripherally spaced from one another about the cylindrical tube 50. As the brush 31 rotates about its cylindrical tube 50, one group of bristles 52 after another sweeps against the sod 24 and sweeps away or cuts off a portion of the loosened soil 25. The bristles are preferably traveling at a speed of three to six times the speed of the conveyor so that the bristles actually scoop and lift the soil as the bristles travel forwardly and then upwardly. The majority of the soil 25 goes into the gaps 54 between the bristle groups as the bristle groups sweep across the sod one after another and the soil 25 is thrown by the rotating bristles 52 forwardly away from the section of sod 24. By way of example, it was found that good results were obtained by making each group of bristles 52 approximately 4 to 6 bristles wide, with eight separate groups of bristles disposed about the periphery of the cylindrical tube 50, and each of the bristles formed of nylon strands 3 ½ inches to 4 inches in length. The brush 31 rotates so as to sweep across the sod sections 24 in their direction of travel. Rotation of the brush 31 in a direction opposing the travel of the sod sections 24 has been found to undesirably lift the sod and add stress to the sod. These bristles actually brush the roots embedded in the soil.

When rotating the brush 31 in the direction of travel of the sod sections 24, the pressure of the bristles 52 against the grass sod sucks the grass sod under the brush 31 with the bristles tending to raise the leading end 29 of the sod section 24 upwardly as shown in FIG. 11.

To prevent the leading end 29 of the sod from being raised upwardly under the influence of the rotating bristles 31, the water dispensing tube 46a immediately following the brush 31 has its slits 48 positioned to direct a stream of water onto the sod where it first emerges from under the bristles 52, as best illustrated in FIG. 6. The force of the stream of water pushes the leading end 29 of the sod downwardly so that it does not raise up when swept by the brush 31. Thus, the water from dispensing tube 46a serves to hold down the leading end 29 of the sod long enough so that it can be cleansed properly. A portion of the water from the water dispensing tube 46a is also directed onto the brush 31 to wash dirt from the brush and also provide cooling of the brush.

It was found that, depending upon soil conditions, a brush speed to conveyor speed ratio of between 3:1 and 6:1 provided good results. For typical soil conditions a brush speed to conveyor speed ratio of 3:1 produced good results. For heavier soils, such as those having a large clay content, it was found that a larger ratio of brush speed to conveyor speed, on the order of 6:1 may be required. The increased brush speed required for heavier soils is in addition to the usage of additional water in the soaking stage 26 for such heavier soils, as discussed above.

The water dispensing pipe 46b immediately preceding the brush 31 has its slits 48 positioned to direct a stream of water onto the brush-sod interface. The water from the pipe 46b serves as a flux to facilitate removal of the soil by the rotating brush 31. That is, the water from pipe 46b assures that the soil is a slurry at the time of being swept by the brush 31. The faster moving brush pushes the water and soil slurry to lift and to sweep the soil forwardly in the direction of conveyor travel relative to the slower traveling sod on the conveyor belt. The bristles of the rotating brush also rub directly against the grass roots and clean them by scrubbing.

Preferably, the brush 31 is adjusted to a height at which the bristles 52 just barely touch the grass roots 23. It has been found that positioning of the brush at this height provides effective removal of the soil 25 without damaging the roots 23 to a detrimental extent. Slight scratching damage and stimulation of the roots 23 is desirable, though, as discussed further below. The water from the pipe 46b also serves as a coolant. The repeated rubbing of the bristles 52 against the sod sections 24 has been found to warm the brush 31 significantly, particularly after prolonged usage. The stream of cooling water from the pipe 46b has been found sufficient to prevent significant heating of the brush 31. Water from the irrigation line is typically from an aquifer or other underground source, and therefore sufficiently cool in its natural state.

After emerging from under the brush 31, the section of grass sod is advanced upon the conveyor 22 to the flooding or rinsing station 30 of the apparatus 20. As mentioned briefly above, the rinsing station 30 comprises a plurality of water dispensing pipes 46 spaced upwardly from the conveyor 22 to allow passage of sections of sod 24 therebeneath. The water flows downwardly from the water dispensing pipes 46 through the slits 48 formed therein, and the low pressure water washes away the loosened soil that is now in a slurry with only a very minimal amount of soil 25 remaining on the grass roots and grass blades which were not swept away by the brush 31. When brushed by the rotating brush 31, some of the soil 25 flies off the sod 24, but some falls back onto it. The water at the rinsing station 30 rinses off the soil which has fallen back onto the sod.

To allow for variation of the speed of the rotating brush 31, a hydraulic pump (not shown), such as that found on conventional tractors, is connected to the apparatus 20 to power a hydraulic motor 64 on the apparatus 20. Control of the speed of the brush is important to accommodate varying soil conditions. The same rate of water dispersement onto the sod is generally employed regardless of the soil condition, but the speed of the brush 31 is varied dependent upon the particular soil conditions, with faster brush rotation being employed for cleansing of heavier soils. Likewise, the speed of the conveyor may also be varied. The hydraulic motor may be driven by a take-off drive from a tractor. A suitable gasoline or diesel motor could be attached to the wagon, if desired.

The hydraulic pump of a tractor connected to the apparatus 20 also powers the conveyor 22 through a hydraulic motor 56. As best seen in FIG. 1, the hydraulic motor 56 drives the conveyor 22 through a gear box 58. A chain 60 extends between the output shaft of the gear box 58 and the sprockets at the end of the drive roller 66 to operatively connect the motor 56 to the conveyor 22. The hydraulic motor 56 and gear box 58 are disposed within a gear box housing 62 on the underside of the apparatus 20. Alternatively, the apparatus may be operated entirely off of a hookup to a standard irrigation line, which typically operates at about 45 psi. and puts out 500 gallons of water per minute. Another alternative is to power the rotary brush 31 with a gas motor, however this is not desirable due to the lack of speed control attainable with gas motors.

Figure 2:
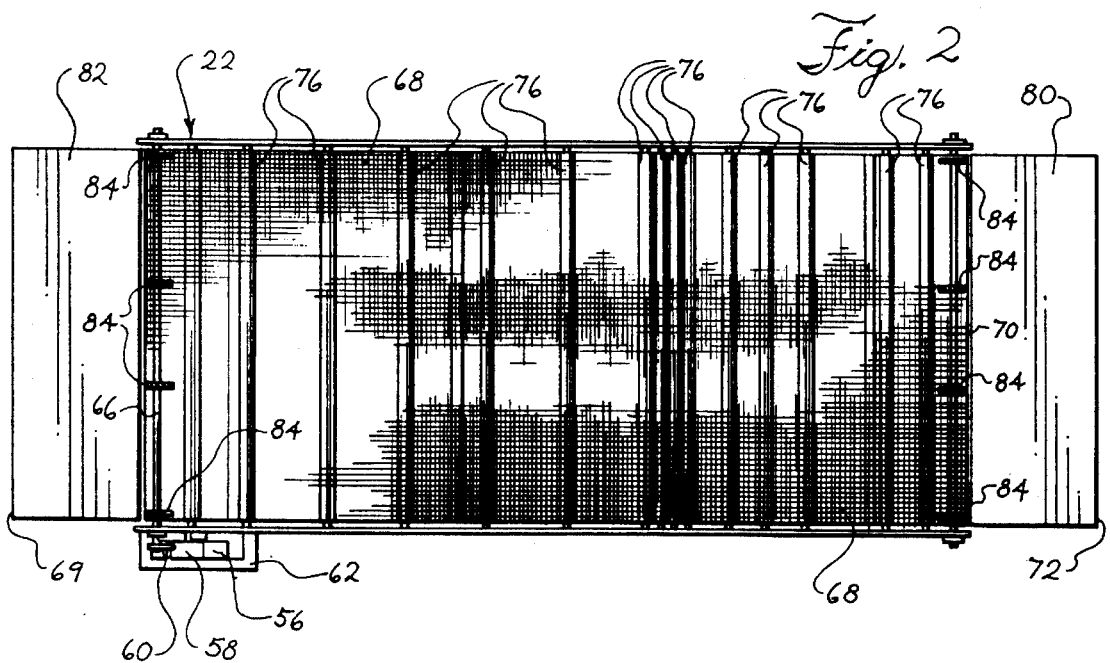
FIG. 2 is a plan view of the conveyor of the apparatus of FIG. 1.

The arrangement of the conveyor 22 which transports the sections of sod 24 is best seen in FIGS. 1, 2 and 5 and comprises a flexible wire mesh 68 which runs about a drive roller 66 at the unloading end 69 of the conveyor 22 and a return roller 70 at the loading end 72 of the conveyor 22. The conveyor belt is preferably made of steel with the wire mesh 68 defining square holes therethrough. The grass blades 21 sit directly upon the wire mesh 68 of the conveyer 22 which holds the sod sections 24 in a stationary position on the conveyor, with the holes of the conveyor allowing water and loosened soil to fall therethrough. With particular reference to FIG. 1, the upper end of travel of the wire mesh 68 is supported upon a plurality of support rollers 76 to hold the upper run of the conveyor belt in a generally horizontal position. While slacking or sagging of the upper run of the conveyor belt is acceptable elsewhere along the conveyor's upper run, it is important that the conveyor 22 be maintained sturdily in a horizontal position in the brushing stage 28 to maintain the section of sod 24 in a horizontal position while it is acted upon by the brush 31. Accordingly, a plurality of very closely spaced support rollers 76 are provided beneath the upper run of the conveyor belt across the brushing stage 28 to maintain the sod level while it is brushed by the brush 31.

The drive roller 66 and return roller 70 are narrow in diameter and have a plurality of sprocket wheels 84 disposed thereon at a plurality of spaced locations along the length of rollers 66 and 70. The sprocket wheels 84 engage with the wire mesh 68 to prevent slippage of the drive roller 66 and return roller 70 with respect to the wire mesh 69 of the conveyor 22.

At the loading end 72 of the apparatus 20, a shelf 80 is provided for stacking sections of sod 24 thereon prior to being loaded onto the conveyor 22. Likewise, at the unloading end 69 of the apparatus 20, a shelf 82 is provided for supporting sections of sod 24 after they have been unloaded from the conveyor 22.

Grass sod is typically cut into sections which are 6 foot in length, with a width of 18 inches or 24 inches. In order to maximize production rates, it is preferred that the sod sections 24 be run widthwise through the apparatus 20; that is, with the 18-inch width of the sod sections being in the direction of travel. In the prior art, the sod sections were run lengthwise with six-foot length being in the direction of travel which took longer to run through the apparatus. Were the sod run with its length extending in the direction of travel, soil 25 brushed away by the brush 31 would fall back onto the sod, making for an inefficient process. With the sod run through the apparatus widthwise, the soil is lifted and is swept forwardly by the rotary brush 31 and washed and thrown off of the sod.

Unexpectedly, and advantageously, it has been found that the brushing of the root and soil side 33 of the sod section 24 in accordance with the present invention raises the root ends 27 upwardly which facilitates improved growth of the roots 23 into the recipient soil site. Additionally, it was found that by brushing against the roots 23 and scratching the roots, and pulling out some of the small root hairs which extend out from the roots 23, the roots have a greater propensity for growing faster and sending out new shoots which further facilitates improved growth of the roots 23 into the recipient soil site.

While slight damage to the roots is desirable for improved growth, it is important that the roots 23 not be damaged too extensively or else growth is reduced or halted completely. It is believed that damage to up to one-third of the roots will still result in increased growth, but that damage in excess of this will retard growth since the grass sod needs to heal itself before sending our new shoots or growing. Damage to approximately one-tenth of the roots has been found to result from the sod brushing method and apparatus of the present invention, and this has been found to provide excellent results in the growth of the roots 23 of the sod 24 into the recipient soil site.

In the prior art, a bar with sturdy metal tines was used to break up large clumps of soil so that the soil could be washed away with the high pressure water jets. This is undesirable since it heavily damages the roots over lines of ⅛ to ¼ inch width in the sod, which lines are spaced about one inch to 1 ½ inches apart. The sod does not grow as well over these damaged lines.

As best seen in FIG. 12, the brushing of the roots 23 also raises the roots upwardly, or on end, so that when the cleaned section of grass sod is laid, the ends 27 of the raised roots 23 extend more downwardly toward the recipient soil on which the sod is laid. This significantly increases the speed with which the laid sod section bonds securely to the soil of the ground. This is particularly advantageous in applications such as putting greens and footballs fields wherein there may be a short time between laying of the sod and participating in physical activities on the sod. Where the sod is not sufficiently bonded, the roots are easily pulled up from the soil and the sod becomes loose and is usually destroyed by such activities. Typically, sod washed in accordance with the brushing method and/or apparatus of the present invention will "net", or bond securely, to the recipient soil within around 4 or 5 days. Conventional, uncleansed sod requires around 2 or 3 weeks to net.

The brushing and raising up of some of the roots 23 of the sod 24 also effects some untangling of the mesh of the thatch so that when the sod is watered following laying of the sod, the water trickles through the thatch and roots down into the subsoil more readily than with conventional, unwashed sod. Since the water is down in the subsoil rather than being held up top, the roots have a greater propensity for growing quickly down into the subsoil where the water is accumulated. This further accelerates bonding or netting of the sod to the recipient soil.

With conventional, uncleansed sod, since the thin layer of soil associated with the sod section 24 is nutrient rich, approximately 80% of the roots remain in the soil of the sod even after the sod has been laid for quite some time. In the event of a shortage of water supply, such as a drought, the layer of soil of the sod dries out, whereas the subsoil which resides further down beneath the surface of the laid sod is usually still moist. Since the roots 23 tend to remain in the nutrient rich thin soil layer of conventional sod, the roots of the unwashed sod do not extend down far enough at the time of the drought to reach the moist subsoil, and thus the uncleansed soil is more susceptible to drying out than the cleansed sod of the present invention.

Cleansing of the soil 23 from the sod also allows good viewing of the roots of the sod, so that root discoloration associated with soil-borne diseases can be more easily detected. This allows one to know in advance of laying the sod that certain curative agents may be required, which can save considerable cost.

The thatch layer of the cleansed sod acts as a sponge, and retains water within the thatch to keep the sod cool for three or four days which provides time for shipping of the sod. Particularly, the apparatus utilizes water from an irrigation line which typically comes from an underground water reservoir and is therefore cool, so that the cool water helps to keep the sod cool. Under hot weather conditions, it is important that the sod be maintained cool. Hence, under hot conditions, the cleaned sod is stored and/or shipped in a refrigerated environment to prevent the temperature of the sod from heating up to the point where the grass becomes dormant, which typically occurs at about 90° F. The sod sections are taken off the apparatus 20, folded over into thirds as shown in FIG. 10, and the folded sections of sod stacked on top of one another.

As will now be appreciated, the method and apparatus of the present invention is suitable for cleansing a wide variety of different soil types ranging from heavy sand content to heavy clay content. The method and apparatus are suitable for use with cleansing of bent grass as well as blue grass an other types of grasses. No blower or other mechanical drying of the sod sections is required.

What is claimed is:

1. A method of washing soil from a strip of sod having grass and grass roots to provide a cleaned strip of sod; said method comprising the steps of:

traveling the sod along a predetermined path past a soaking station;

soaking the sod with water to loosen the soil from the grass roots at the soaking station;

brushing the loosened soil in the forward direction of travel to scrub the soil from the grass roots at a brushing station; and applying water to the loosened soil scrubbed from the grass roots to transport the loosened, scrubbed soil from the grass roots.

2. A method in accordance with claim 1 including the step of laying the strip of sod on a continuously traveling conveyor with the length of the strip extending transversely across the conveyor, and the step of brushing the loosened soil forwardly in the direction of conveyor travel across the width of the sod strip.

3. A method in accordance with claim 1 including the steps of providing a portable sod washer;

moving the portable sod washer into a field location; and dropping the water and soil removed from the sod directly into the field.

4. A method in accordance with claim 1 including the step of scrubbing the soil from the grass roots with a rotating brush having spaced clusters of bristles traveling at a speed faster than the sod is traveling along the predetermined path.

5. A method in accordance with claim 4 including the step of moving the bristles at a speed at least three times as fast as the travel speed, and the faster traveling bristles lifting the loosened soil and throwing some of the loosened soil upwardly.

6. A method in accordance with claim 4 including the step of increasing the rotational speed of the brush to scrub heavier soils from the grass roots.

7. A method in accordance with claim 1 in which the soaking of the sod at the soaking station includes the step of flowing a sufficient volume of water to loosen the soil without sufficient water pressure to flow all of the loosened soil from the grass roots.

8. A method in accordance with claim 1 including the step of applying substantially more than 150 g.p.m. of water to soil at a pressure substantially below 70 psi to form a soil slurry at the brushing station and a water flooding of the slurry to carry the soil from the grass roots to avoid blowing holes in the sod with high pressure water and to avoid damaging of longitudinal edges of the strip of cleaned sod.

9. A method in accordance with claim 1 including the step of brushing of the grass roots at the brushing station with flexible bristles that slightly scrape or damage the roots to stimulate new grass root growth.

10. A method in accordance with claim 9 including the step of rotating the brush in the direction of travel at a speed substantially greater than the travel speed and lifting the grass roots upwardly with the bristles.

11. A method of washing a length of grass sod having an upper side with grass blades and a lower side with the root structure of the grass embedded in a thickness of soil, comprising the steps of:

soaking the length of grass sod with water; and brushing the soil side of the length of grass sod with a brush to brush away substantially all of the grass soil from the length of sod to provide a mat of grass blades held together by its root structure.

12. A method in accordance with claim 11 including the step of applying water directly to the point of contact of the brush with the sod.

13. A method in accordance with claim 11 including the step of carrying the length of grass sod on a conveyor to the water soaking and brushing steps.

14. A method in accordance with claim 13 wherein the brush comprises a rotary brush rotating at a predetermined rate and advancing the conveyor and the length of grass sod past the rotary brush at a predetermined speed, with the speed of the rotating brush being greater than the speed of advancement of the length of sod.

* * * * *

UNITED STATES PATENT AND TRADEMARK OFFICE
CERTIFICATE OF CORRECTION

PATENT NO. : 5,454,190
DATED : October 3, 1995
INVENTOR(S) : Habenicht, et al.

It is certified that error appears in the above-indentified patent and that said Letters Patent is hereby corrected as shown below:

Column 11, line 7, before "soil" delete "grass".

Column 11, line 8, before "sod" insert --grass--.

Signed and Sealed this

Twenty-third Day of January, 1996

Attest:

BRUCE LEHMAN

*Attesting Officer*     *Commissioner of Patents and Trademarks*